Patented May 1, 1934

1,957,124

UNITED STATES PATENT OFFICE 1,957,124

VARIABLE TORQUE FLUID TRANSMISSION

Clarence Eugene Yahn, Los Angeles, Calif.

Application November 30, 1932, Serial No. 645,102

1 Claim. (Cl. 60—54)

This invention relates to and has for a purpose the provision of a transmission which utilizes a body of liquid as an operative connection between driving and driven elements in such manner as to subject one element to torque in response to motion of the other element.

It is a further purpose of the invention to provide a fluid transmission embodying a chamber adapted to contain a body of liquid, and wherein are mounted driving and driven rotors structurally characterized and correlated in such manner that rotation of the driving rotor will cause liquid in the chamber to apply torque to the driven rotor, the torque being variable in accordance with the level of liquid in the chamber; the pressure imposed upon the liquid; and the speed of rotation of the driving rotor.

Only one form of the invention will be described, following which its novel features will be pointed out in the claim.

In the accompanying drawings

Similar reference characters designate similar parts in each of the several views.

Figure 1:
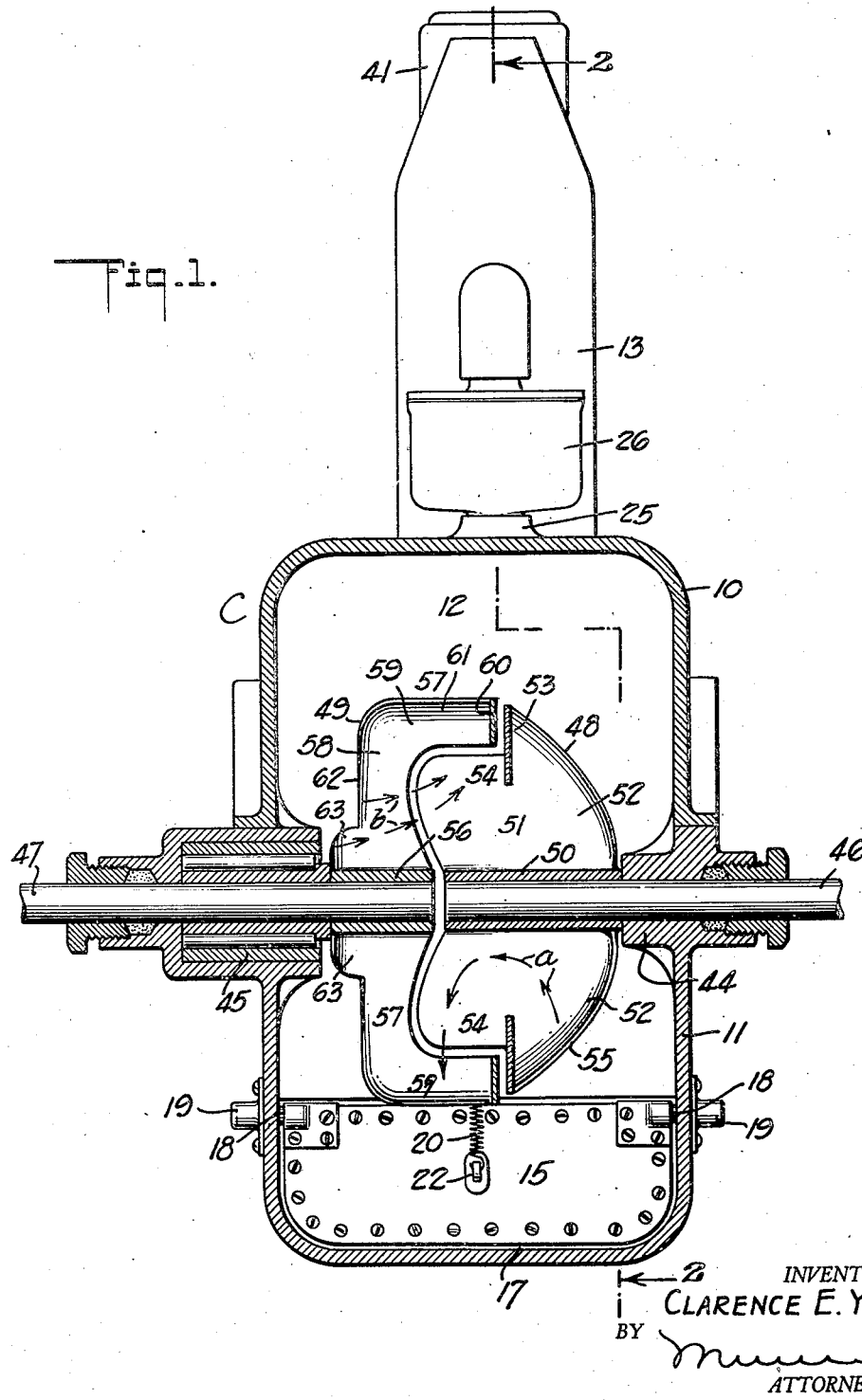
Figure 1 is a view of the transmission in longitudinal vertical section.

Referring specifically to the drawings, this invention comprises a cylindrical casing C composed of upper and lower sections 10 and 11 coacting to provide a chamber 12. The section 11 is provided with a tangential extension forming a cylinder 13, one end of which is provided with a lateral opening 14 of rectangular contour, placing the lower end of the cylinder in communication with the chamber and being controlled by a valve 15.

Figure 2:
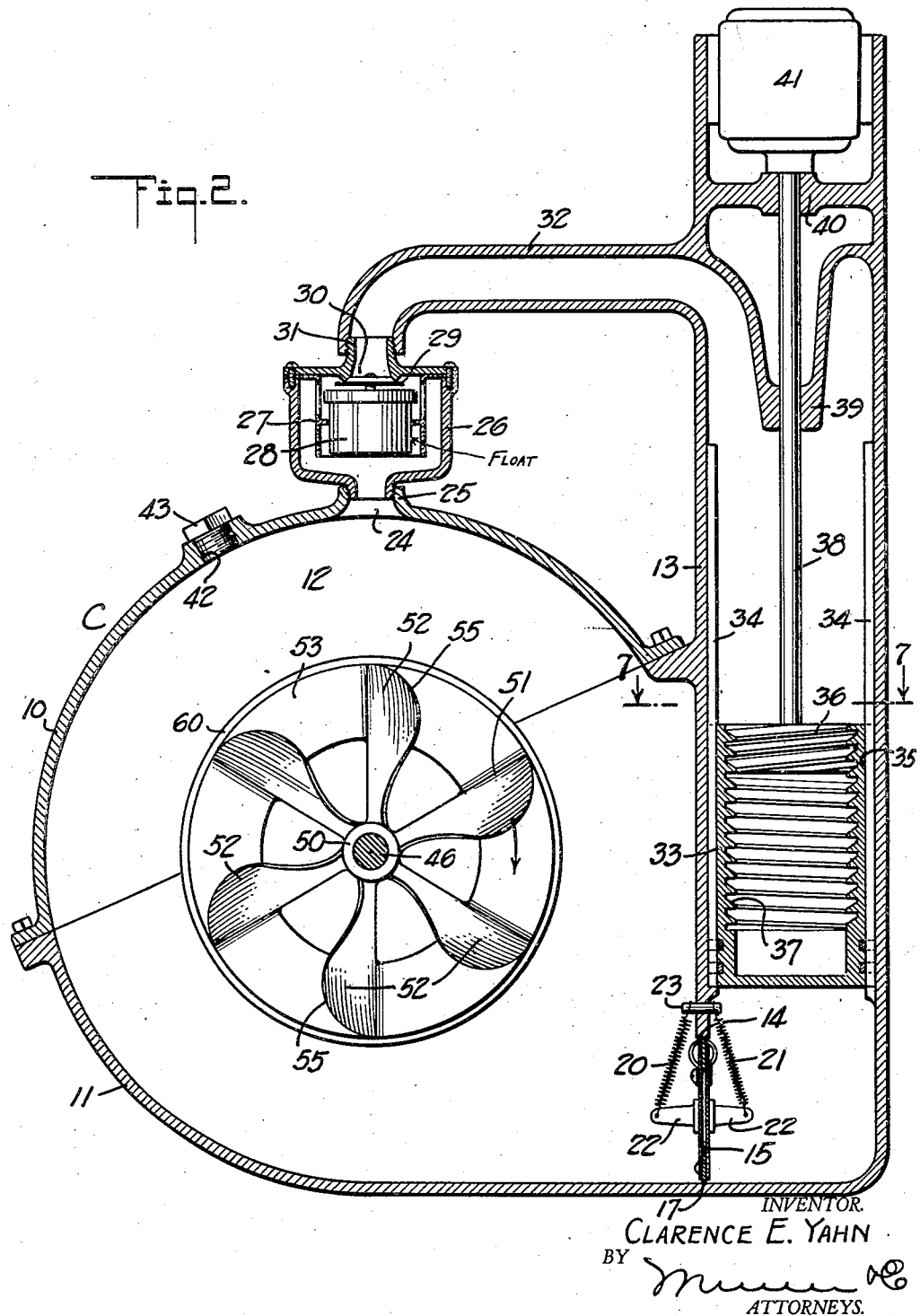
Figure 2 is a transverse vertical sectional view taken on the line 2—2 of Figure 1.

The valve 15 comprises a rectangular plate having a sealing gasket 17 projecting from its marginal edge, and being provided with pivot pins 18 alined and projecting from opposite ends of the plate at one longitudinal edge thereof. The pins 18 are journaled in bearings 19 on opposite sides of the casing section 11 so as to mount the valve for swinging movement from the central and closed position shown in Figure 2, against the opposed actions of springs 20 and 21 secured to lugs 22 projecting from opposite sides of the plate, and to a pin 23 supported by the casing section, all as shown in Figure 2. In the closed position of the valve, the gasket 17 has wiping engagement with the wall of the opening 14 so as to provide a liquid-tight seal.

At the uppermost portion of the section 10, the chamber 12 is provided with an opening 24 bounded by a collar 25 to which is connected a valve body 26 supporting therein a cage 27 in which is mounted a float 28 supporting a valve 29. The valve 29 controls a port 30 in the body, bounded by a collar 31 to which is connected a pipe 32 leading to the upper end of the cylinder 13 so as to place this end of the cylinder in communication with the chamber when the valve 29 is open.

Figure 7:
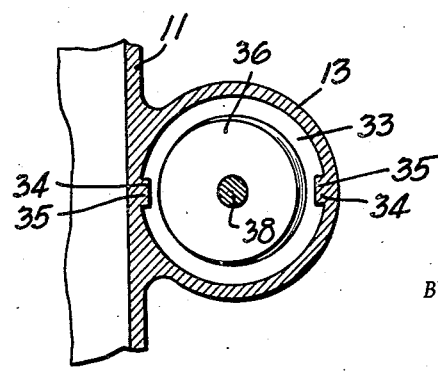
Figure 7 is a sectional view taken on the line 7—7 of Figure 2.

Mounted in the cylinder 13 for movement longitudinally thereof between the opening 14 and the location at which the pipe 32 communicates with the cylinder, is a piston 33 which is confined against rotation by longitudinally extending keys 34 in the cylinder, entering keyways 35 formed in the periphery of the piston at diametrically opposed points, as shown in Figure 7. The piston is cup shaped so as to be closed at its lower end and open at its upper end to receive an actuating screw 36 having threaded engagement with internal threads 37 in the piston. The screw 36 is secured to one end of a shaft 38 journaled in bearings 39 and 40 in the upper end of the cylinder. The other end of the shaft is in the present instance connected to an electric motor 41 of the reversible type, supported by the cylinder and enabling the shaft and hence the screw 36 to be rotated in one direction or the other for coaction of the screw with the threads 37 of the piston, in feeding the latter longitudinally in the cylinder in one direction or the other. The motor 41 is shown simply for the purpose of illustrating a means for rotating the screw 36 in one direction or the other, and it is to be understood that any suitable manually operable means could be provided for this purpose.

In practice, a predetermined quantity of liquid, such as oil, is supplied to the chamber 12 through a filling opening 42 normally closed and sealed by a screwplug 43, the level of the body of oil in the chamber being controlled by the piston 33. It will be clear that upon upward movement of the piston in the cylinder the suction created by the piston in the cylinder will swing the valve 15 open against the tension of the spring 20 so as to draw oil from the chamber into the cylinder and thus lower the level of oil in the chamber, whereas upon downward movement of the piston, the pressure created by the piston on the oil in advance of the piston will reversely swing the valve 15 against the tension of the spring 21 so as to force oil from the cylinder into the chamber and thereby raise the level of oil in the chamber.

When the piston is at rest in the cylinder, the valve 15 occupies its closed position so as to function in preventing oil in the cylinder from flowing back into the chamber should air from the chamber above the body of oil therein leak past the piston, it being understood that this air is normally free to circulate back and forth between the chamber and the portion of the cylinder above the piston, via the valve body 26 and pipe 32. The quantity of oil originally supplied to the chamber is such that when the piston is adjacent its lowermost extreme position in the cylinder, the oil will completely fill the chamber and will be disposed at a level in the valve body 26 to raise the float 28 sufficiently to close the valve 29 and thereby trap the oil in the chamber. Thus any further downward movement of the piston will place the oil under pressure for a purpose to be later described.

Journaled in alined bearings 44 and 45 in the section 11 of the casing C are driving and driven shafts 46 and 47 which have respectively fixed thereto, within the casing, rotors 48 and 49. The rotor 48 is provided with a hub 50 from which project, at equally spaced intervals, circumferentially thereof, blades 51, of which six are shown in the present instance. The blades 51 are provided with scoop shaped portions 52, the outer ends of which terminate at an integrally formed ring 53 concentric with respect to the hub 50.

The blades 51 continue through the opening of the ring 53 into flat and radial portions 54. The ring is thus disposed intermediate the portions 52 and 54 of the blades, the opening of the ring permitting the passage of liquid from the scoop portions to the radial portions or vice versa. The contours of the scoop portions 52 are such that with a body of liquid contained in the chamber 12, and with the shaft driven in the direction of the arrow in Figure 2, liquid will be drawn inwardly of the blades from the leading edges 55 of the scoop portions, in the general path of the arrows *a* in Figure 1, so as to be forced between the blades through the opening of the ring 53, and then forced outwardly by the centrifugal action of the radial portions 54 of the blades.

The rotor 49 is provided with a hub 56 from which project at equally spaced intervals circumferentially thereof, L-shaped blades 57 of which six are shown. The blades 57 define radial portions 58 and axial portions 59, which latter portions terminate in an integrally formed ring 60 concentric with the hub 56 and disposed opposite and in proximity to the ring 53 of the rotor 48, as shown in Figure 1. The radial blade portions 54 of the rotor 48 project freely through the ring 60 into the space inwardly of the blades 57 of the rotor 49.

Figure 3:
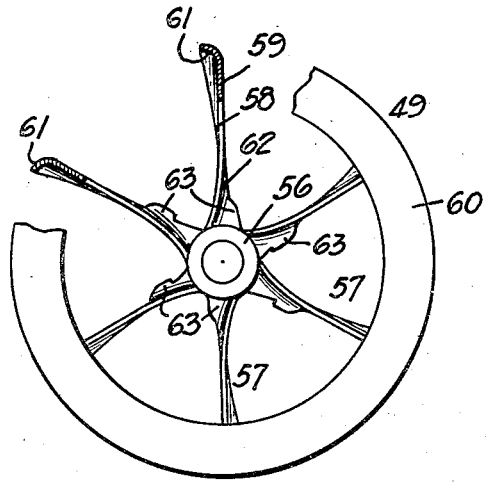
Figure 3 is a view of the driven rotor in front elevation, partly broken away.
Figure 4:
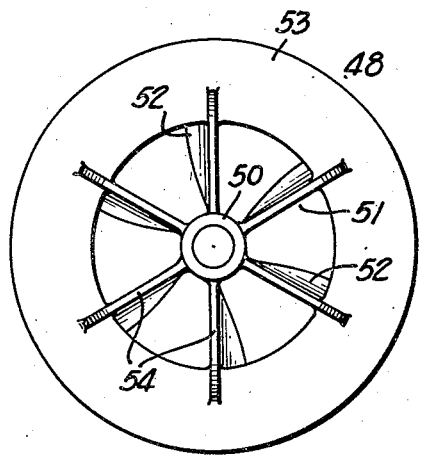
Figure 4 is a view of the driving rotor in rear elevation.
Figure 5:
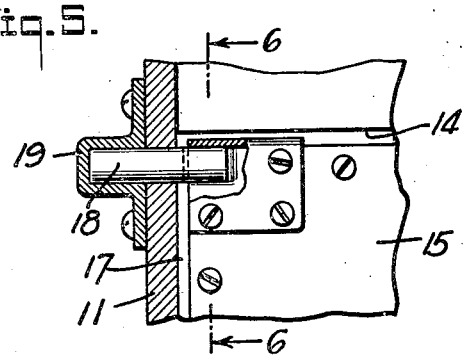
Figure 5 is an enlarged detail sectional view illustrating a hinge mounting for a valve embodied in the transmission.
Figure 6:
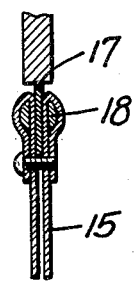
Figure 6 is a sectional view taken on the line 6—6 of Figure 5.

The peripheral edge of each of the axial portions 59 of the blades 57 is curved in a direction circumferentially of the rotor, as indicated at 61, and the curvature of this edge decreases and then reverses along the radial portion 58 of each blade, as indicated at 62 in Figure 3. It will be clear that the liquid that is forced outwardly by the centrifugal action of the radial blade portions 54 of the driving rotor 48 will be caused to impinge against the concave surfaces of the curved peripheral edges 61 of the driven rotor blades 57 so as to tend to drive the rotor 49 in the same direction as the driving rotor 48. The torque to which the driven rotor 49 is thus subjected by the liquid is dependent on the amount of oil supplied to the chamber 12; the speed of the driving rotor; and the pressure imposed on the liquid in the chamber by the piston 33 following closing of the float operated valve 29. It will be understood that the body of liquid when placed under pressure becomes more compact or unyielding so as to deliver its maximum torque to the rotor 49.

The radial portions 58 of the blades 57 are provided with curved fins 63 which function as scoops and coact with the reversely curved edges 62 should the rotor 49 become the driving rotor, in delivering liquid to the radial portions 54 of the blades 51 of the rotor 48 in the general path indicated by the arrows *b* in Figure 1, so as to tend to drive the rotor 48. Thus in the case of applying the transmission to an automobile, the braking effect of the engine could be utilized when descending grades, as the shaft 46 would constitute the engine shaft and the shaft 47 the propelling shaft under the driving action of the rear wheels of the vehicle. It will be noted that the fins 63 are so disposed at different locations radially on the radial portions 58 of the blades 57 as to produce cleavage of the surrounding liquid and thus prevent hysteresis.

It is to be understood that in practice the capacity of the scoop portions 52 of the driving rotor blades 51 is such that the portions 52 will, through centripetal and scooping actions, supply the maximum amount of liquid required for the radial portions 54 of the blades, which latter are designed to impart centrifugal force in the circulation of this liquid before it is released to impinge against blades 57 of the driven rotor 49, on which the load is imposed.

The ring 53 not only provides a support for blades 51, but also functions as a wall for guiding the liquid being scooped inwardly from the surrounding body of liquid by the blade portions 52 in the following manner.

The peripheries or toes of the scoop portions 52 continuously gather liquid from the liquid body immediately surrounding the rotor 48, with the result that the scooping action is continuous throughout an entire revolution, thereby causing the liquid originally entrained by the scoop portions to become packed and eventually forced by centripetal action of the scoop portions 52 past the ring 53 and into the path of liquid likewise being scooped up to supply blade portions 54, the ring 53 serving to guide the inwardly moving liquid into the operating path of the blade portions 54. The liquid being continuously cleft from the surrounding body is directed into the controlled path of the liquid which, in being supplied to the blade portions 54, is advantageously directed against such blade portions near the shaft so that centrifugal force is given the opportunity to impart the desired velocity to the liquid before it impinges against the faces of the blades 57 of the driven rotor 49.

The scooping action of the portions 52 at higher speeds is reduced a limited amount by a churning action of the entering edges of these portions upon the liquid immediately surrounding the portions. This would ordinarily result in a loss of the liquid required to circulate relatively undisturbed to the blade portions 54, unless the wall formed by the ring 53 is provided to increase the scooping capacity.

This walled in effect of the ring 53 creates at lower speeds, the added advantage of preventing leakage of eddy currents of liquid entrained in the toes of the scoop portions 52 from seeking the line of least resistance and inefficiently following a shorter path seemingly open to leaking eddy currents between the rings 53 and 60 which in practice are in sufficiently close proximity to have merely a running clearance.

At the high speeds at which this transmission is designed to operate, the entrained liquid that is thrown out by blade portions 54 does not readily seek the path of least resistance. This tendency exists only when the rotor 48 is rotating very slowly and when the centrifugal force imparted to the liquid by the blade portions 54 is only sufficient to slowly circulate the liquid through such paths of least resistance.

At working speeds, the entrained liquid travels in a path which is a fairly straight tangent and mostly in a radially outward direction until it impinges against the concave surfaces 61 of the driven rotor blades 57, so that it usefully expends its kinetic energy upon these blades in producing torque on the driven shaft.

I claim:

In a fluid transmission, a chamber adapted to contain a body of liquid; a rotor rotatably mounted in the chamber and having blades provided with scoop portions and radial portions forming continuations of the scoop portions in an axial direction; the contour of said scoop portions being such that upon rotation of the rotor in one direction liquid in the chamber will be drawn inwardly of the rotor and delivered to said radial portions so as to be forced outwardly by the latter under the action of centrifugal force, a second rotor rotatably mounted in the chamber in axial alinement with the first rotor and having L-shaped blades defining radially and axially extending portions, with the latter portions disposed outwardly of the radial blade portions of the first mentioned rotor, the peripheral edges of said axial portions being curved in a direction circumferentially of the rotor so that liquid impinging thereagainst from the radial blade portions of the first mentioned rotor will exert torque upon the second mentioned rotor to tend to rotate same, the radial portions of the blades of the second mentioned rotor curving reversely from said axial portions and having fins along the length thereof for the purpose described.

CLARENCE EUGENE YAHN.